United States Patent [19]

Senshu et al.

[11] Patent Number: 4,822,424
[45] Date of Patent: Apr. 18, 1989

[54] HEXAKISAZO DYES-CONTAINING AQUEOUS COMPOSITIONS

[75] Inventors: Hisashi Senshu; Sadahiko Matsubara; Tamotsu Naito, all of Osaka, Japan

[73] Assignee: Orient Chemical Industries Ltd., Japan

[21] Appl. No.: 140,148

[22] Filed: Dec. 30, 1987

Related U.S. Application Data

[62] Division of Ser. No. 891,571, Jul. 29, 1986, Pat. No. 4,758,659.

[30] Foreign Application Priority Data

Aug. 1, 1985 [JP] Japan ................. 60-170390

[51] Int. Cl.$^4$ .................. C09B 31/30; C09B 33/18; C09B 35/64; C09D 11/00
[52] U.S. Cl. ......................... 106/22; 106/23; 534/679; 534/805
[58] Field of Search ............. 106/22, 23; 534/679, 534/805

[56] References Cited

U.S. PATENT DOCUMENTS

| | | | |
|---|---|---|---|
| 1,938,976 | 12/1933 | Payne | 534/687 X |
| 2,178,757 | 11/1939 | Jordan et al. | 534/805 |
| 2,428,130 | 9/1947 | Straub et al. | 534/805 |
| 3,969,339 | 7/1976 | Sailer et al. | 534/679 X |
| 4,141,889 | 2/1979 | Allan | 534/689 |

FOREIGN PATENT DOCUMENTS

| | | | |
|---|---|---|---|
| 955802 | 1/1957 | Fed. Rep. of Germany | 534/805 |
| 1080313 | 12/1954 | France | 534/805 |
| 26210 | of 1897 | United Kingdom | 534/679 |
| 578001 | 6/1946 | United Kingdom | 534/805 |
| 578002 | 6/1946 | United Kingdom | 534/805 |
| 785084 | 10/1957 | United Kingdom | 534/679 |

Primary Examiner—Floyd D. Higel
Attorney, Agent, or Firm—McGlew & Tuttle

[57] ABSTRACT

A composition comprising an aqueous solution of, and also an aqueous ink containing, a hexakisazo dye represented by the formula

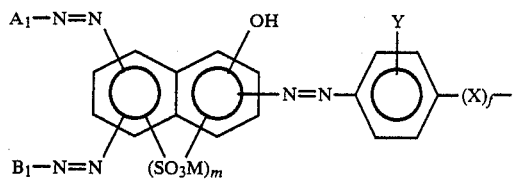

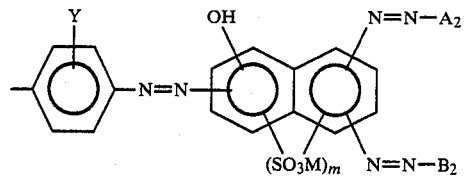

wherein X is —CH=CH—, —CONH—, —CRH— (wherein R is phenyl which may have H or a sulfonic acid group), —SO$_2$— or —O—; Y is H, CH$_3$, OCH$_3$, Cl or SO$_3$M); A$_1$ and A$_2$ are each

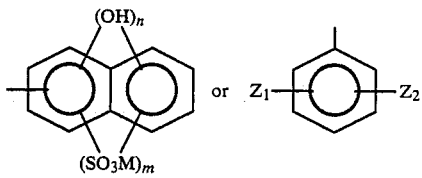

(wherein Z$_1$ is H, Cl, CH$_3$, OH, OCH$_3$, OC$_2$H$_5$ or SO$_3$M, and Z$_2$ is H, CH$_3$, NO$_2$ or COOM; B$_1$ and B$_2$ are each

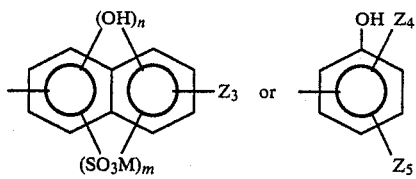

(wherein Z$_3$ is H, OH, NH$_2$, Cl or COOM, Z$_4$ is H, Cl, CH$_3$, OH, OCH$_3$, NH$_2$, COOM or SO$_3$M, and Z$_5$ is H, C$_1$–C$_4$ alkyl or OH); M is H, Na, K, Li or NH$_4$; f is 0 or 1; m is 0, 1 or 2; and n is 0, 1 or 2.

6 Claims, No Drawings

HEXAKISAZO DYES-CONTAINING AQUEOUS COMPOSITIONS

This is a division of application Ser. No. 891,571 filed July 29, 1986, now U.S. Pat. No. 4,758,659, issued July 19, 1988.

BACKGROUND OF THE INVENTION

1. Field of the Invention

The present invention relates to novel hexakisazo dyes suitable for dyeing cellulose, natural or synthetic polyamide materials, leather, etc. and also to aqueous ink compositions comprising the novel hexakisazo dye and suited to writing implements, jet printing, recording instruments, etc.

2. Description of the Prior Art

Various azo dyes and aqueous ink compositions containing such azo dyes have heretofore been disclosed which are widely used and have great industrial usefulness. Accordingly, it has been desired in the art to provide more effective azo dyes and aqueous ink compositions thereof.

SUMMARY OF THE INVENTION

To meet the demand, the present invention provides hexakisazo dyes and aqueous ink compositions thereof which have an excellent black color, high water resistance and lightfastness and high solubility with good stability and which are useful for wider industrial applications than conventional products.

The present invention provides hexakisazo dyes represented by the formula

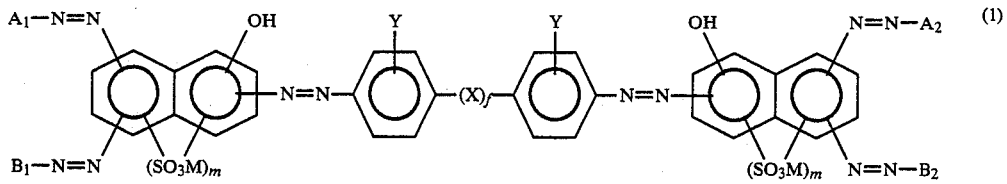

wherein X is —CH=CH—, —CONH—, —CRH— (wherein R is phenyl which may have H or a sulfonic acid group), —SO$_2$— or —O—; Y is H, CH$_3$, OCH$_3$, Cl or SO$_3$M; A$_1$ and A$_2$ are each

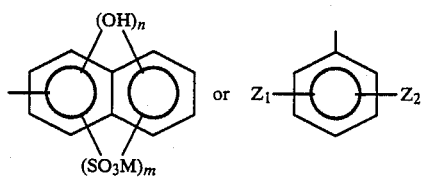

(wherein Z$_1$ is H, Cl, CH$_3$, OH, OCH$_3$, OC$_2$H$_5$ or SO$_3$M, and Z$_2$ is H, CH$_3$, NO$_2$ or COOM); B$_1$ and B$_2$ are each

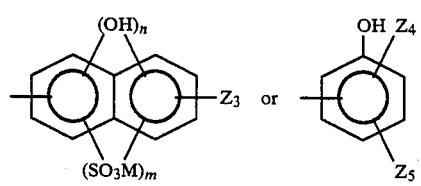

(wherein Z$_3$ is H, OH, NH$_2$, Cl or COOM, Z$_4$ is H, Cl, CH$_3$, OH, OCH$_3$, NH$_2$, COOM or SO$_3$M, and Z$_5$ is H, C$_1$-C$_4$ alkyl or OH); M is H, Na, K, Li or NH$_4$; f is 0 or 1; m is 0, 1 or 2; and n is 0, 1 or 2.

The present invention further provides aqueous ink compositions which are characterized in that the composition comprises the hexakisazo dye of the formula (1). The compositon is prepared by admixing the hexakisazo dye with water and a water-soluble organic solvent, and when required, further with a water-soluble surfactant, water-soluble resin, additives, etc. Typically, the present compositions are used for writing implements, jet printing, recording instruments, etc.

The hexakisazo dyes and aqueous ink compositions thereof according to the present invention have an excellent black color and are outstanding in properties such as water resistance, lightfastness, solution stability and the like.

DETAILED DESCRIPTION OF THE INVENTION

The hexakisazo dyes of the present invention represented by the formula (1) are prepared by the following process.

First step

A disazo dye is prepared by tetrazotizing in the usual manner a compound represented by the formula

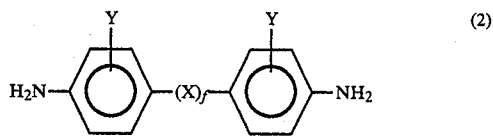

wherein X is —CH=CH—, —CONH, —CRH— (wherein R is phenyl which may have H or a sulfonic acid group), —SO$_2$— or —O—, Y is H, CH$_3$, OCH$_3$, Cl or SO$_3$H, and f is 0 or 1, and coupling the product with a compound represented by the formula

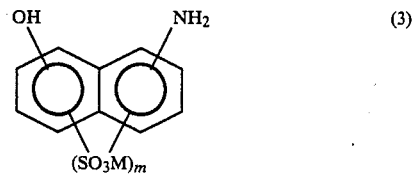

wherein m is 0, 1 or 2.

Second step

A tetrakisazo dye is prepared by diazotizing a compound represented by the formula

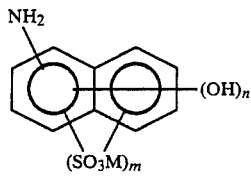

wherein m is 0, 1 or 2, and n is 0, 1 or 2, or a compound represented by the formula

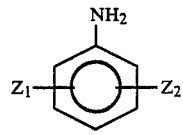

wherein $Z_1$ is H, Cl, $CH_3$, $OCH_3$, $OC_2H_5$ or $SO_3H$, and $Z_2$ is H, $CH_3$, $NO_2$ or COOH, and coupling the product with the disazo dye obtained by the first step.

Third step

The desired hexakisazo dye is prepared by tetrazotizing the tetrakisazo dye obtained again, i.e., per the second step, and coupling the resulting tetrazotized compound with a compound represented by the formula

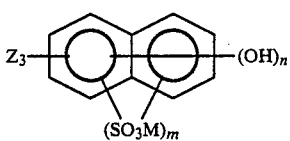

wherein $Z_3$ is H, OH, $NH_2$, Cl or COOH and/or a compound represented by the formula

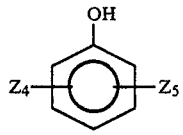

wherein $Z_4$ is H, Cl, $CH_3$, OH, $OCH_3$, $NH_2$, COOH or $SO_3H$ and $Z_5$ is H, $C_1$-$C_4$ alkyl or OH.

Alternatively, the desired hexakisazo dye can be prepared by diazotizing a compound of the formula (4) or formula (5), then coupling the diazotized compound with a compound of the formula (3) to obtain a monoazo dye, coupling the monoazo dye with the tetrazotized compound prepared from a compound of the formula (2) to obtain a tetrakisazo dye, tetrazotizing the tetrakisazo dye again to obtain a tetrakisazo dye, and coupling the resulting tetrazotized compound with a compound of the formula (6) and/or a compound of the formula (7).

It is also possible to prepare the desired hexakisazo dye by tetrazotizing again the disazo dye obtained from the first step, then coupling the resulting compound with a compound of the formula (6) and/or a compound of the formula (7) to obtain a tetrakisazo dye, and coupling the tetrakisazo dye with the diazotized compound prepared from a compound of the formula (4) or the formula (5).

In the process for preparing the desired substance represented by the formula (1), it is possible to use a mixture, for example, of various amines of the formula (4) or various aniline derivatives instead of using a homogeneous starting compound. In this case, a dye mixture is obtained which is similar to the individual dyes in properties. According to the contemplated purpose, the desired dye or dye mixture obtained is purified by salting out. When converted to an alkali salt with use of a desired alkali, the dye gives a highly water-soluble dye. Examples of useful alkalis are sodium hydroxide, potassium hydroxide, lithium hydroxide, ammonia water and the like.

Examples of useful compounds represented by the formula (2) are 4,4'-diaminostilbene-2,2'-disulfonic acid, 4,4'-diaminodiphenyl ether, 4,4'-diaminodiphenylsulfone, 3,3'-dimethylbenzidine, 3,3'-dimethoxybenzidine, 3,3'-dichlorobenzidine, 2,2'-benzidinedisulfonic acid, 4,4'-diaminodiphenylmethane, 4,4'-diaminoditolylmethane, 4,4'-diaminotriphenylmethane, 4,4'-diamino-3,3'-dimethoxy-2"-sulfotriphenylmethane, 4,4'-diaminobenzanilide and the like.

Examples of useful compounds represented by the formula (3) are 1-amino-8-naphthol-4-sulfonic acid, 2-amino-5-naphthol-7-sulfonic acid, 1-amino-8-naphthol-3,6-disulfonic acid, 1-amino-8-naphthol-4,6-disulfonic acid and the like.

Examples of useful compounds represented by the formula (4) are 1-aminonaphthalene, 1-amino-4-naphthalenesulfonic acid, 1-amino-5-naphthalenesulfonic acid, 1-amino-6-naphthalenesulfonic acid, 1-amino-7-naphthalenesulfonic acid, 1-amino-8-naphthalenesulfonic acid, 2-amino-1-naphthalenesulfonic acid, 5-amino-1-naphthol, 1-amino-5-naphthol-7-sulfonic acid, 2-amino-8-naphthol-6-sulfonic acid, 1-amino-8-naphthol-2,4-disulfonic acid, 1-amino-8-naphthol-3,6-disulfonic acid, 1-amino-8-naphthol-4,6-disulfonic acid and the like.

Examples of useful compounds represented by the formula (5) are aniline, toluidine, xylidine, p-chloroaniline, m-aminophenol, anisidine, p-phenetidine, p-cresidine, anthranilic acid, 5-sulfoanthranilic acid, p-aminobenzoic acid, metanilic acid, sulfanilic acid, p-aminosalicylic acid, p-nitroaniline and the like.

Examples of useful compounds represented by the formula (6) are 1-naphthol, 2-naphthol, 1-naphthol-4-sulfonic acid, 1-naphthol-5-sulfonic acid, 1-naphthol-8-sulfonic acid, 2-naphthol-6-sulfonic acid, 1-naphthol-3,6-disulfonic acid, 2-naphthol-3,6-disulfonic acid, 8-chloro-1-naphthol-3,6-disulfonic acid, 2-naphthol-3-carboxylic acid, 1-amino-6-naphthalenesulfonic acid, 2-amino-1-naphthalenesulfonic acid, 5-amino-1-naphthol, 1-amino-8-naphthol-4-sulfonic acid, 2-amino-5-naphthol-7-sulfonic acid, 2-amino-8-naphthol-6-sulfonic acid, 1-amino-8-naphthol-2,4-disulfonic acid, 1-amino-8-naphthol-3,6-disulfonic acid, 1-amino-8-naphthol-4,6-disulfonic acid and the like.

Examples of useful compounds represented by the formula (7) are phenol, chlorophenol, cresol, resorcinol, phenol-4-sulfonic acid, m-aminophenol, 4-tert-butylphenol, catechol, phloroglucin, 4-hydroxyanisole, 2-tert-butyl-4-hydroxyanisole, salicylic acid, 5-sulfosalicylic acid and the like.

Examples of suitable water-soluble organic solvents which are admixed with the dye of the formula (1) are glycol solvents such as ethylene glycol, diethylene glycol, propylene glycol and thiodiglycol, cellosolve solvents, alcohol solvents, carbitol solvents, alkanolamines and the like. Examples of water-soluble surfactants which are admixed with the dye of the formula (1) when required are N-alkylpyrrolidones, vinylpyrrolidone derivatives, anionic surfactants, nonionic surfactants, ampholytic surfactants, etc. Natural or synthetic water-soluble resins are usable as the water-soluble resin to be admixed with the dye of the formula (1). The additives usable include pH adjusting agents, disinfectants, corrosion inhibitors or metal sequestering agents, etc.

Examples of hexakisazo dyes embodying the invention and represented by the formula (1) are shown below in the form of free acids. These dye compounds were prepared in the following examples, in which the parts are by weight.

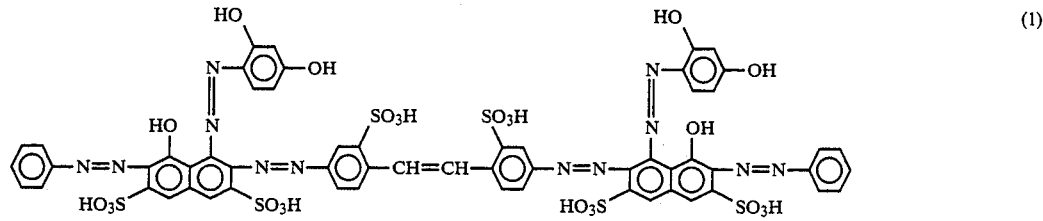

(1)

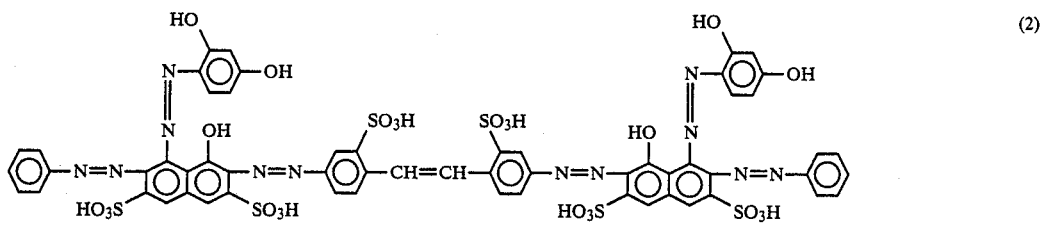

(2)

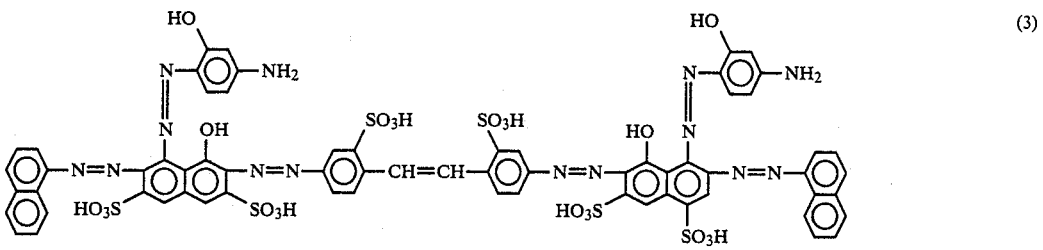

(3)

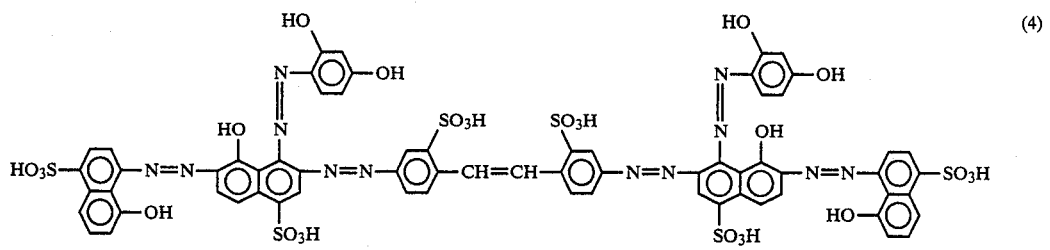

(4)

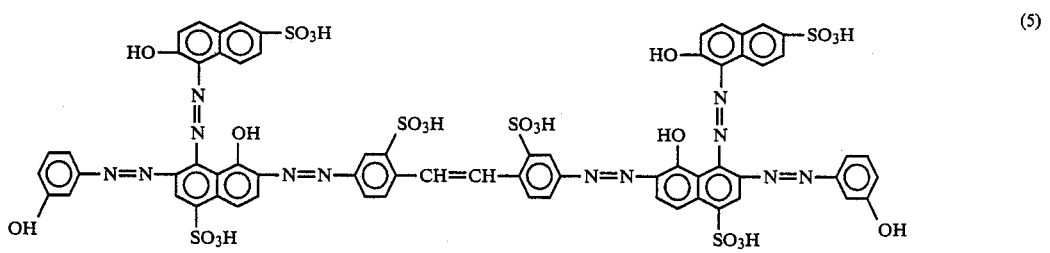

(5)

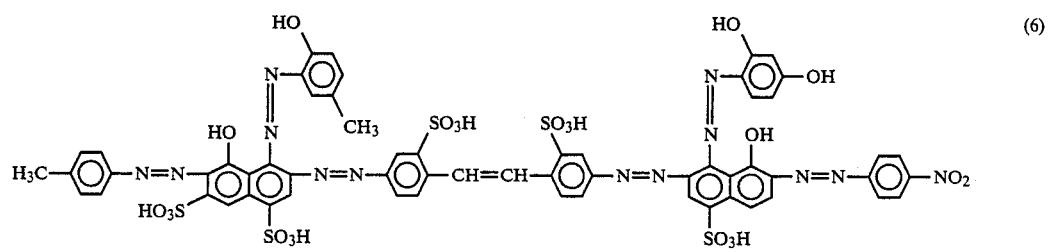

(6)

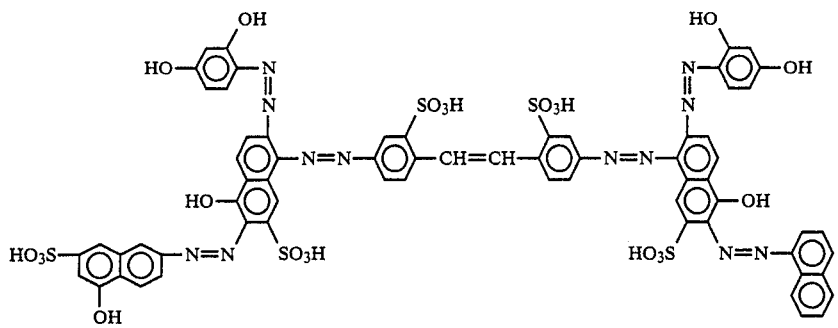
(7)
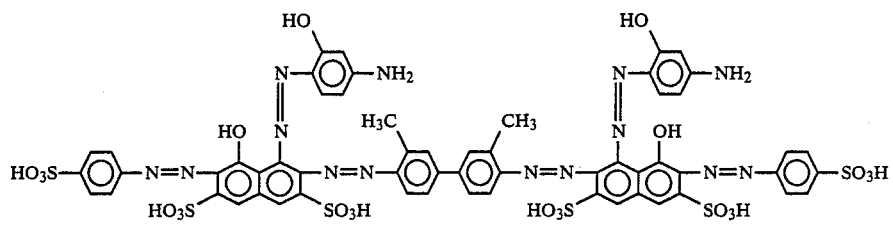
(8)
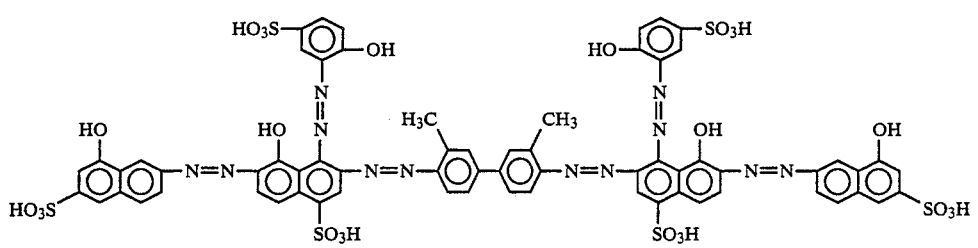
(9)
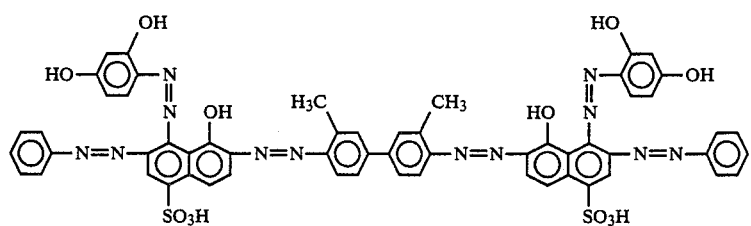
(10)
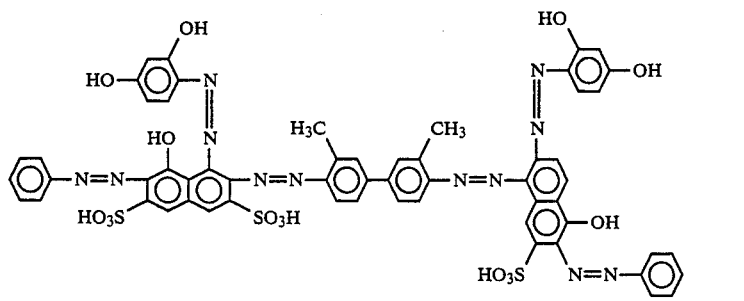
(11)
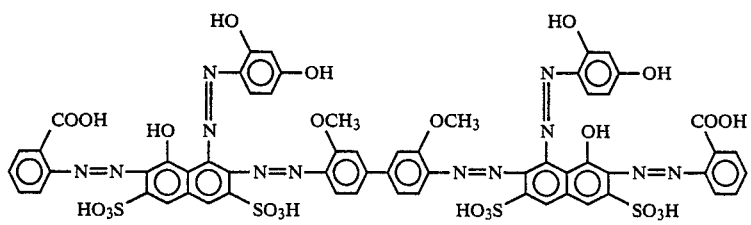
(12)

-continued
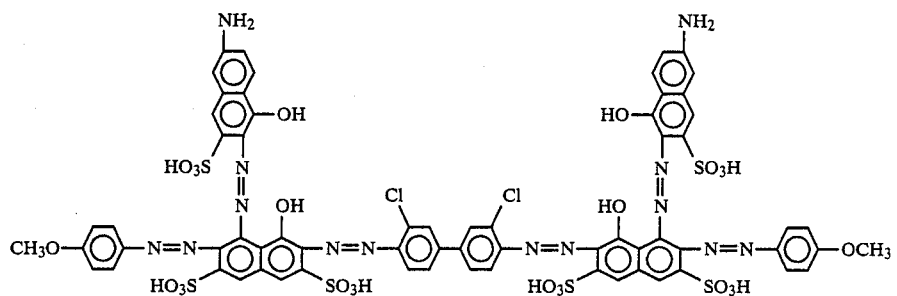
(13)
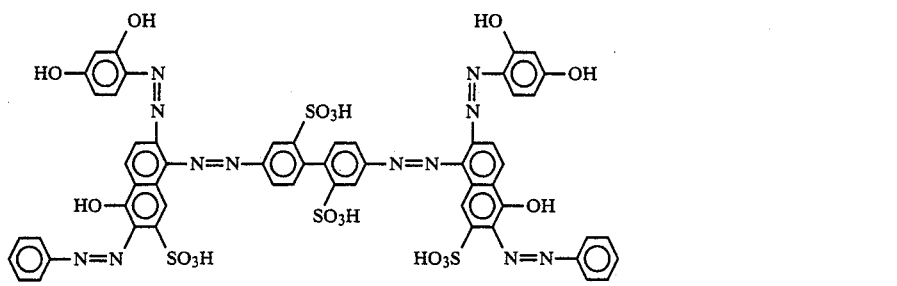
(14)
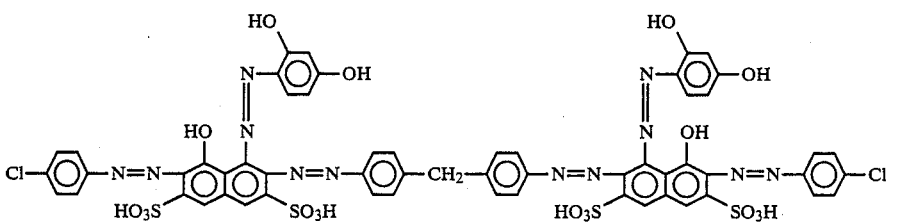
(15)
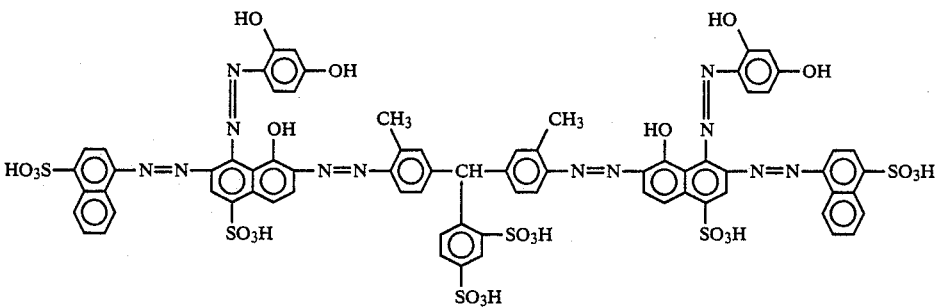
(16)
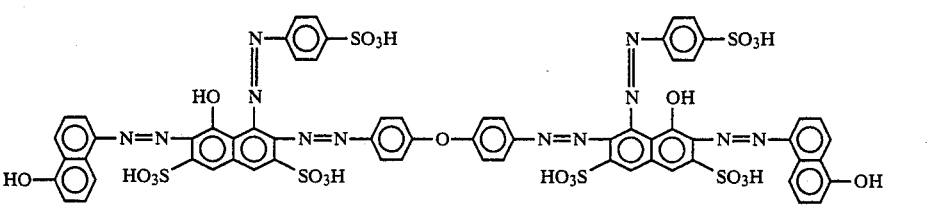
(17)
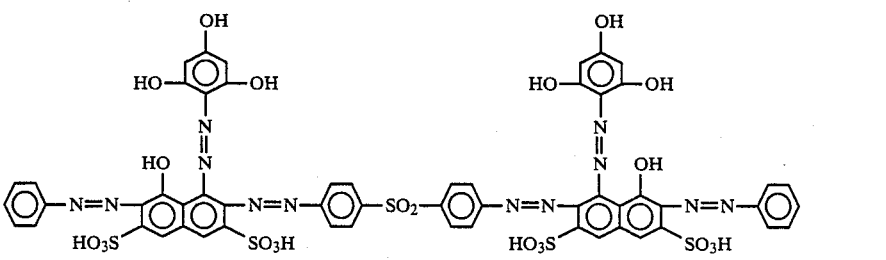
(18)

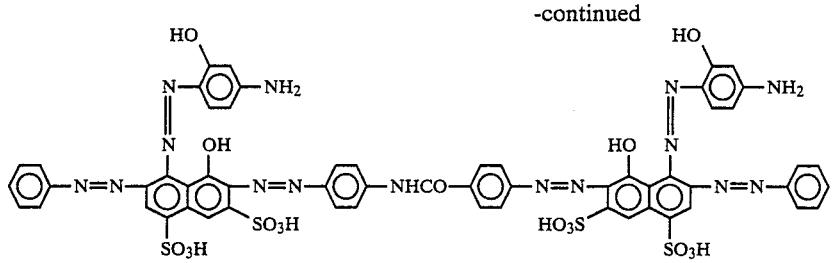

(19)

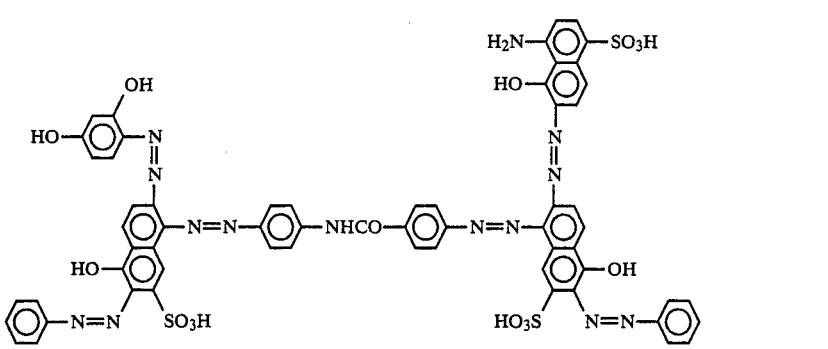

(20)

EXAMPLE 1 (SYNTHESIS OF COMPOUND EXAMPLE 1)

1. Tetrazotization of 4,4'-diaminostilbene-2,2'-disulfonic acid 4,4'-Diaminostilbene-2,2'-disulfonic acid (74 g, 0.2 mole) was dispersed in 2000 c.c. of water, and 27.5 g of sodium carbonate was added to the dispersion to completely dissolve the acid. The solution was thereafter stirred at a temperature of 70° to 80° C. for 1 hour. A 100 g quantity of 35% hydrochloric acid was slowly added dropwise to the solution to obtain a slurry, which was then stirred for 30 minutes. After cooling the slurry to a temperature of up to 5° C. with addition of 500 g of ice, a solution of 28 g of sodium nitrite in 100 c.c. of water was added dropwise to the slurry over a period of 30 minutes. In the meantime, the pH of the mixture was adjusted to 1.5 to 1.8. The mixture was further stirred at a temperature of up to 5° C. for 2 hours, giving a yellow slurry.

2. First coupling (acid coupling)

A 136.4 g quantity (0.4 mole) of 1-amino-8-naphthol-3,6-disulfonic acid (monosodium salt) was dispersed in 500 c.c. of water, and the dispersion was stirred for 1 hour with addition of 40 g of 50% caustic soda solution to completely dissolve the acid. The solution was added dropwise to the above slurry over a period of 30 minutes. In the meantime, the mixture was adjusted to a pH of 3.0 to 3.5. The mixture was further stirred at a temperature of up to 10° C. for 15 hours and thereafter stirred with addition of 160 g of 50% caustic soda solution for 1 hour.

3. Second coupling (alkaline coupling)

Aniline (37.2 g, 0.4 mole) was admixed with 500 c.c of water and 100 g of 35% hydrochloric acid, 200 g of ice was added to the mixture, and a solution of 28 g of sodium nitrite in 100 c.c. of water was added dropwise to the resulting mixture to effect diazotization. After stirring the mixture for 1 hour, the excess of nitrous acid was decomposed with sulfamic acid, the mixture was filtered, and the resulting filtrate was added dropwise to the first coupling solution over a period of 30 minutes. The mixture was adjusted to a pH of 8.5 to 9.0 with an aqueous solution of sodium carbonate and stirred at a temperature of up to 10° C. for 15 hours.

4. Third diazotization-coupling

To the second coupling solution was added a solution of 28 g of sodium nitrite in 100 c.c. of water, and the mixture was stirred for 30 minutes and then cooled to a temperature of up to 5° C. with addition of 1 kg of ice. A 130 g quantity of 35% hydrochloric acid was thereafter added dropwise to the mixture over a period of 30 minutes to effect tetrazotization. The mixture was adjusted to a pH of 1.5 to 1.8 and further stirred for 2 hours. Resorcin (44 g, 0.4 mole) was dispersed in 500 c.c. of water and completely dissolved therein with addition of 60 g of 50% solution of caustic soda. The solution was added dropwise to the tetrazotized solution over a period of 30 minutes. The mixture was adjusted to a pH of 8.5 to 9.0 and stirred at a temperature of up to 10° C. for 15 hours to complete the reaction.

5. Salting out

The reaction mixture was heated to 80° to 85° C., and hydrochloric acid and common salt were added to the mixture for salting out. The resulting precipitate was filtered off and washed with dilute hydrochloric acid containing common salt, giving 480 g of a wet cake of compound example 1.

The wet cake was dispersed in 1000 c.c. of water and completely dissolved therein with addition of 50% caustic soda solution. The solution was adjusted to a pH of 10 to 10.5, followed by filtration and drying to give 140 g of bluish black sodium salt of compound example 1.

EXAMPLE 2 (SYNTHESIS OF COMPOUND EXAMPLE 2)

1. Aniline (37.2 g, 0.4 mole) was admixed with 500 c.c. of water and 100 g of 35% hyrochloric acid, 200 g of ice was added to the mixture, and a solution of 28 g of sodium nitrite in 100 c.c. of water was added dropwise to the resulting mixture to effect diazotization. After stirring the mixture for 1 hour, the excess of nitrous acid was decomposed with sulfamic acid, followed by filtration.

A 136.4 g quantity (0.4 mole) of 1-amino-8-naphthol-3,6-disulfonic acid (monosodium salt) was dispersed in 500 c.c. of water, and the dispersion was stirred for 1 hour with addition of 40 g of 50% caustic soda solution to completely dissolve the acid. This solution was added dropwise to the above diazotized solution over a period of 30 minutes. The mixture was adjusted to a pH of 3.0 to 3.5 and stirred at a temperature of up to 10° C. for 15 hours. With the addition of 80 g of 50% caustic soda solution, the mixture was subsquently stirred for 1 hour.

2. 4,4'-Diaminostilbene-2,2'-disulfonic acid (74 g, 0.2 mole) was tetrazotized in the same manner as in Example 1 to obtain a yellow slurry. The slurry was added dropwise to the solution resulting from the preceding step over a period of 30 minutes. The mixture was adjusted to a pH of 8.5 to 9.0 and stirred at a temperature of up to 10° C. for 15 hours.

3. A solution of 28 g of sodium nitrite in 100 c.c. of water was added to the reaction mixture, followed by stirring for 30 minutes. After cooling the resulting mixture to a temperature of up to 5° C. with addition of 1 kg of ice, 130 g of 35% hydrochloric acid was added dropwise to the mixture over a period of 30 minutes to effect tetrazotization. The reaction mixture was adjusted to a pH of 1.5 to 1.8 and further stirred for 2 hours.

Resorcin (44 g, 0.4 mole) was dispersed in 500 c.c. of water and completely dissolved therein with addition of 60 g of 50% caustic soda solution. This solution was added dropwise to the tetrazotized solution prepared above over a period of 30 minutes. The mixture was adjusted to a pH of 8.5 to 9.0 and stirred at a temperature of up to 10° C. for 15 hours to complete the reaction.

4. The reaction mixture was subjected to aftertreatment in the same manner as in Example 1, giving 520 g of wet cake of compound example 2. The wet cake was dispersed in 1000 c.c. of water and completely dissolved therein with addition of 50% lithium hydroxide solution. The solution was adjusted to a pH of about 10, followed by filtration and drying to give 135 g of the lithium salt of compound example 2 which was black.

EXAMPLE 3 (SYNTHESIS OF COMPOUND EXAMPLE 9)

1. Tetrazotization of 3,3'-dimethylbenzidine 3,3'-Dimethylbenzidine (42.4 g, 0.2 mole) was dispersed in 500 c.c. of water, and the dispersion was stirred at a temperature of 70° to 80° C. for 1 hour with addition of 130 g of 35% hydrochloric acid to completely dissolve the benzidine. After cooling the solution to a temperature of up to 5° C. with addition of 500 g of ice, a solution of 28 g of sodium nitrite in 100 c.c. of water was added dropwise to the solution. In the meantime, the mixture was adjusted to a pH of 1.5 to 1.8 and further stirred at a temperature of up to 5° C. for 2 hours to obtain a yellow solution.

2. First coupling (acid coupling)

A 136.4 g quantity (0.4 mole) of 1-amino-8-naphthol-3,6-disulfonic acid (monosodium salt) was dispersed in 500 c.c. of water. The dispersion was stirred for 1 hour with additon of 40 g of 50% caustic soda solution to completely dissolve the acid. This solution was added dropwise to the yellow solution over a period of 30 minutes. In the meantime, the mixture was adjusted to a pH of 3.0 to 3.5. The mixture was further stirred at a temperature of up to 10° C. for 15 hours and subsequently stirred for 1 hour with addition of 160 g of 50% caustic soda solution.

3. Second coupling (alkaline coupling)

Sulfanilic acid (69.2 g, 0.4 mole) was dispersed in 300 c.c. of water, and the dispersion was stirred at 70° to 80° C. for 30 minutes with addition of 21.2 g of sodium carbonate to completely dissolve the acid, followed by cooling to 20° C. A solution of 28 g of sodium nitrite in 100 c.c. of water was then added to the solution. The mixture was stirred for 30 minutes and cooled to a temperature of up to 5° C. with addition of 200 g of ice. A 120 g quantity of 35% hydrochloric acid was thereafter added dropwise to the mixture to effect diazotization. The resulting mixture was added dropwise to the solution obtained by the preceding step over a period of 30 minutes. The mixture was adjusted to a pH of 8.5 to 9.0 with an aqueous solution of sodium carbonate and stirred at a temperature of up to 10° C. for 15 hours.

4. The reaction mixture was then tetrazotized again in the same manner as in Example 1. A solution prepared by dispersing 44 g (0.4 mole) of m-aminophenol in 500 c.c. of water and adding 60 g of 50% caustic soda solution to the dispersion was added dropwise to the resulting reaction mixture. The mixture was adjusted to a pH of 8.5 to 9.0 and stirred at a temperature of up to 10° C. for 15 hours to complete the reaction.

5. The same aftertreatment as in Example 1 then followed to afford a wet cake of compound example 3. The wet cake was dispersed in 400 c.c. of water, and the dispersion was adjusted to a pH of 10 to 10.5 with 50% caustic soda solution and filtered. The filtrate was adjusted to an amount of 1000 g, giving a 15% concentrated aqueous solution of black compound example 3.

EXAMPLES 4–20

The following products were prepared in the same manner as in Examples 1 to 3.

TABLE 1

| Example | Compound example | Color |
| --- | --- | --- |
| 4 | 3 | Bluish black |
| 5 | 4 | Black |
| 6 | 5 | Black |
| 7 | 6 | Bluish black |
| 8 | 7 | Bluish black |
| 9 | 8 | Reddish black |
| 10 | 10 | Reddish black |
| 11 | 11 | Reddish black |
| 12 | 12 | Black |
| 13 | 13 | Reddish black |
| 14 | 14 | Reddish black |
| 15 | 15 | Reddish black |
| 16 | 16 | Bluish black |
| 17 | 17 | Reddish black |
| 18 | 18 | Reddish black |
| 19 | 19 | Bluish black |
| 20 | 20 | Reddish black |

EXAMPLE 21

Bleached pulp of conifer (NBKP) was beaten to the desired degree of looseness by a beater. An aqueous solution of the dye prepared in Example 1 was added to the pulp to a specified concentration to dye the pulp. Fifteen minutes later, a sizing agent was added to the pulp in an amount of about 1% based on the pulp. Subsequently, about 2% of alum cake was added to the pulp for fixing.

Paper dyed reddish black was prepared from the paper stock. The dye had a satisfactory buildup property, and the dyed product had high color fastness.

EXAMPLE 22

Cotton cloth was dyed under the following conditions to obtain black cloth.

| | |
|---|---|
| Dye of compound example 3 (Na salt) | 4.0% o.w.f. |
| Anhydrous sodium sulfate | 10.0% o.w.f. |
| Liquor ratio | 40:1 |
| Temperature, time | 100° C., 60 min. |

The dye had a satisfactory buildup property, and the dyed product had high color fastness.

EXAMPLE 23

Chrome-tanned leather was pretreated with water at 50° C. and placed into a drum along with a 1% warm aqueous solution of the dye (Na salt) of compound example 8 in twice the quantity of the leather. The drum was rotated at 50° to 60° C. for 40 minutes, and thereafter rotated for 20 minutes with addition of a 10% aqueous solution of formic acid to fix the dye, followed by washing with water and drying. Reddish black leather was obtained. The dye had a satisfactory buildup property, and the dyed product had high color fastness.

EXAMPLE 24

| | |
|---|---|
| Dye of Example 1 | 5 parts |
| Ethylene glycol | 10 parts |
| Diethylene glycol | 10 parts |
| Thiodiglycol | 5 parts |
| Butyl cellosolve | 0.5 part |
| Anionic surfactant (brand name: HYTENOL 08, product of Daiichi Kogyo Seiyaku Co., Ltd.) | 0.2 part |
| Disinfectant | 0.5 part |
| Distilled water | 68.5 parts |

The above mixture was stirred at 60° to 70° C. to obtain a solution, which was then filtered with industrial filter paper to prepared a black aqueous ink composition.

The ink composition was placed into a marking pen barrel and tested for writing. The ink flowed out smoothly at all times without any break, producing markings in a distinct color with high resistance to water and good lightfastness.

EXAMPLE 25

A black aqueous ink composition was prepared in the same manner as in Example 24 except that 5 parts of the dye of Example 2 was used in place of the dye used in Example 24.

Like the composition of Example 24, the ink composition obtained exhibited excellent properties.

EXAMPLE 26

| | |
|---|---|
| Dye of compound example 8 (Na salt) | 6 parts |
| Ethylene glycol | 10 parts |
| Diethylene glycol | 10 parts |
| Propylene glycol | 5 parts |
| Anionic surfactant (brand name: HYTENOL 08) | 0.2 part |
| Disinfectant | 0.5 part |
| Distilled water | 68.3 parts |

A black aqueous ink was prepared by treating the above composition in the same manner as in Example 24.

Like the composition of Example 24, the ink composition obtained had excellent properties.

EXAMPLE 27

A black aqueous ink was prepared in the same manner as in Example 26 except that 6 parts of the dye of compound example 19 (K salt) was used in place of the dye used in Example 26.

EXAMPLE 28

| | |
|---|---|
| Dye of compound example 10 (Li salt) | 5 parts |
| Diethylene glycol | 11 parts |
| Triethanolamine | 2 parts |
| Disinfectant | 0.2 part |
| Distilled water | 81.8 parts |

The above mixture was stirred at 30° to 40° C. to obtain a solution, which was then filtered with industrial filter paper. The filtrate was then filtered for purification by a membrane filter, $0.8\mu$ in pore size, to prepare a black ink composition for jet printing.

The ink composition obtained had high stability as a solution, caused no clogging and produced by jet printing prints having a distinct color and good water resistance.

EXAMPLE 29

| | |
|---|---|
| Dye of compound example 17 ($NH_4$ salt) | 5 parts |
| Triethylene glycol | 11 parts |
| N—Methyl-2-pyrrolidone | 2 parts |
| Disinfectant | 0.2 part |
| Distilled water | 81.8 parts |

The above mixture was stirred at 30° to 40° C. to obtain a solution, which was then filtered with industrial filter paper. The filtrate was further filtered for purification by a membrane filter, $0.8\mu$ in pore size, to prepare a black ink composition for jet printing.

The ink composition obtained had high stability as a solution, caused no clogging and produced by jet printing prints having a distinct color and good water resistance.

EXAMPLE 30

| | |
|---|---|
| Concentrated dye solution of Example 3 | 66 parts |
| Methyl cellosolve | 20 parts |
| Surfactant (SCOUROL 900, product of Kao Co., Ltd.) | 10 parts |
| Distilled water | 4 parts |

The above mixture was stirred at 70° to 80° C. to obtain a solution, which was then filtered with industrial filter paper to obtain a black ink for OHP.

Advantages of the invention

By suitably selecting the materials to be reacted, the present invention affords a wide variety of novel hexakisazo dyes ranging from the direct dye type to the acid dye type. The present dyes have an excellent color of the black type, are outstanding in properties such as water resistance, lightfastness and solution stability and are extremely effective for dyeing cellulose, natural or synthetic polyamide materials and leather. The aqueous ink compositions of the present invention are also very useful for writing implements, jet printing, recorders, etc. because of the foregoing characteristics of the hexakisazo dye incorporated therein. Thus, the dyes and the aqueous ink compositions of the invention have great industrial usefulness.

What is claimed is:

1. Aqueous composition comprising an aqueous solution of a hexakisazo dye represented by the formula

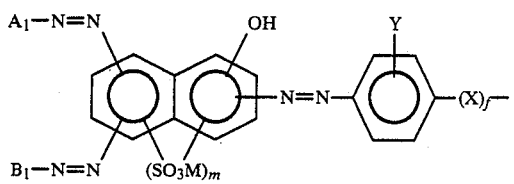

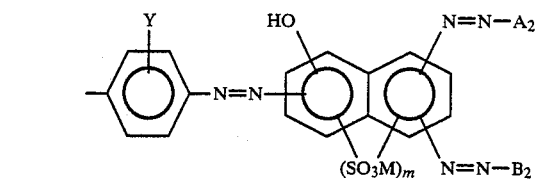

wherein
X is —CH=CH—, —CONH—, —CRH— (wherein R is phenyl which is unsubstituted or substituted by a sulfonic acid group), —SO$_2$— or —O—;
Y is H, CH$_3$, OCH$_3$, Cl or SO$_3$M;
A$_1$ and A$_2$ are each

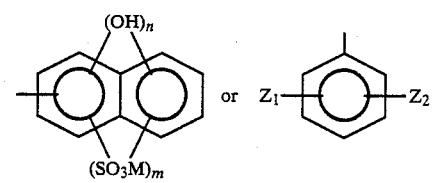

(wherein Z$_1$ is H, Cl, CH$_3$, OH, OCH$_3$, OC$_2$H$_5$ or SO$_3$M, and Z$_2$ is H, CH$_3$, NO$_2$ or COOM);
B$_1$ and B$_2$ are each

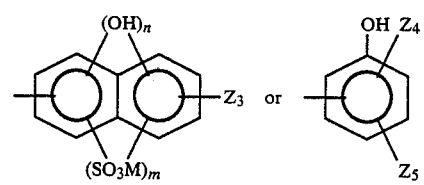

wherein Z$_3$ is H, OH, NH$_2$, Cl or COOM, Z$_4$ is H, Cl, CH$_3$, OH, OCH$_3$, NH$_2$, COOM or SO$_3$M, and Z$_5$ is H, C$_1$-C$_4$ alkyl or OH);
M is H, Na, K, Li or NH$_4$; and
f is 0 or 1; m is 0, 1 or 2; and n is 0, 1 or 2.

2. Aqueous ink composition comprising a hexakisazo dye represented by the formula

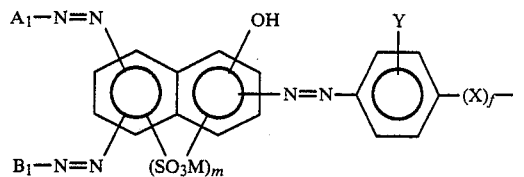

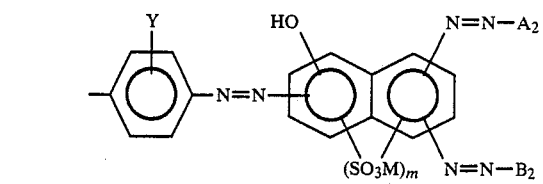

wherein
X is —CH=CH—, —CONH—, —CRH— (wherein R is phenyl which is unsubstituted or substituted by a sulfonic acid group), —SO$_2$— or —O—;
Y is H, CH$_3$, OCH$_3$, Cl or SO$_3$M;
A$_1$ and A$_2$ are each

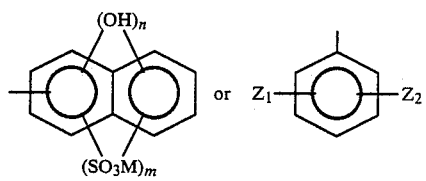

(wherein Z$_1$ is H, Cl, CH$_3$, OH, OCH$_3$, OC$_2$H$_5$ or SO$_3$M, and Z$_2$ is H, CH$_3$, NO$_2$ or COOM);
B$_1$ and B$_2$ are each

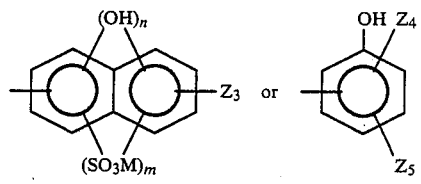

wherein Z$_3$ is H, OH, NH$_2$, Cl or COOM, Z$_4$ is H, Cl, CH$_3$, OH, OCH$_3$, NH$_2$, COOM or SO$_3$M, and Z$_5$ is H, C$_1$-C$_4$ alkyl or OH);
M is H, Na, K, Li or NH$_4$; and
f is 0 or 1; m is 0, 1 or 2; and n is 0, 1 or 2; water, and a water soluble organic solvent.

3. Composition of claim 2 wherein said solvent is selected from the group consisting of glycol, cellosolve, alcohol, carbitol and alkanolamine.

4. Composition of claim 2 including a water soluble surfactant.

5. Composition of claim 2 including a water soluble resin.

6. Composition of claim 2 including a disinfectant.

* * * * *